US012689450B2

(12) United States Patent
Kao

(10) Patent No.: US 12,689,450 B2
(45) Date of Patent: Jul. 21, 2026

(54) SIGNAL TRANSMISSION APPARATUS AND METHOD HAVING MISMATCH CALIBRATION MECHANISM

(71) Applicant: REALTEK SEMICONDUCTOR CORPORATION, Hsinchu (TW)

(72) Inventor: Tzu-Ming Kao, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 262 days.

(21) Appl. No.: 18/744,754

(22) Filed: Jun. 17, 2024

(65) Prior Publication Data

US 2025/0007626 A1    Jan. 2, 2025

(30) Foreign Application Priority Data

Jun. 27, 2023    (TW) ................................. 112123950

(51) Int. Cl.
*H04B 17/11*            (2015.01)
(52) U.S. Cl.
CPC .................................... *H04B 17/11* (2015.01)
(58) Field of Classification Search
CPC ........ H04B 17/14; H04B 17/21; H04B 17/11; H04B 1/0475; H04B 1/0458; H04B 2001/0433
See application file for complete search history.

(56) References Cited

U.S. PATENT DOCUMENTS

2024/0022272 A1*    1/2024    Chang .................. H04B 1/0458
2024/0162921 A1*    5/2024    Chakraborty ........ H04B 1/0028

FOREIGN PATENT DOCUMENTS

CN            110943748 B    *    4/2022    ............. H04B 17/22

* cited by examiner

*Primary Examiner* — Curtis A Kuntz
(74) *Attorney, Agent, or Firm* — WPAT, PC

(57)            ABSTRACT
The present disclosure discloses a signal transmission apparatus having mismatch calibration mechanism. An input circuit performs input signal processing on a first and a second baseband signals orthogonal to each other and forming a complex number baseband signal to generate an input baseband signal. A frequency up-conversion circuit performs frequency up-conversion on the input baseband signal through two signal processing paths having identical configurations and adds processed results to generate an output RF signal. A feedback circuit performs feedback signal processing on the output RF signal to generate a feedback signal. A calibration calculation circuit sets a compensation parameter to be parameter values and retrieves corresponding feedback values from the feedback signal, so as to solve a mismatch parameter between the two signal processing paths of a function of the feedback signal according to the parameter values and the feedback values. The input circuit calibrates the compensation parameter accordingly.

20 Claims, 4 Drawing Sheets

100

400

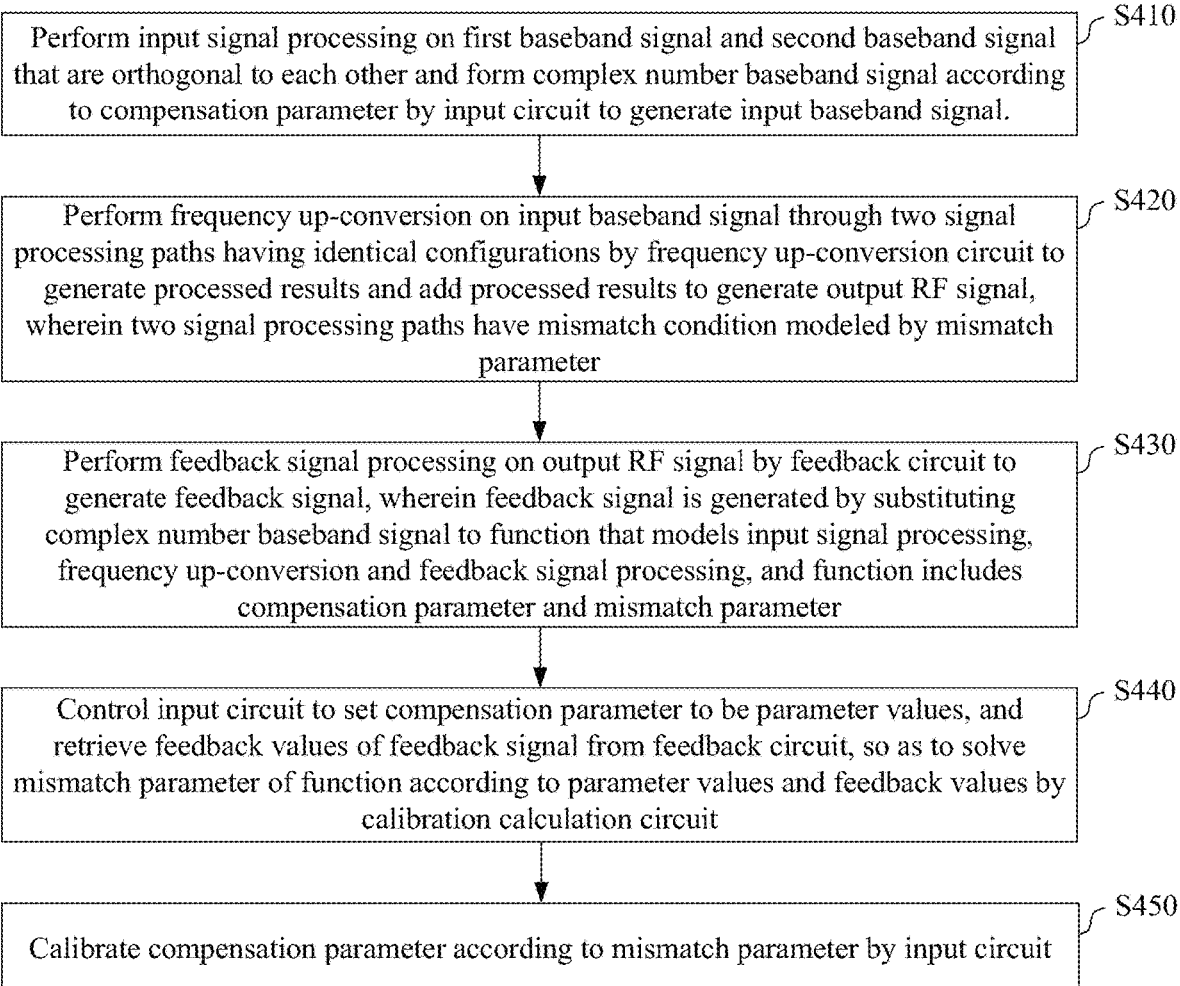

Perform input signal processing on first baseband signal and second baseband signal that are orthogonal to each other and form complex number baseband signal according to compensation parameter by input circuit to generate input baseband signal.          S410

Perform frequency up-conversion on input baseband signal through two signal processing paths having identical configurations by frequency up-conversion circuit to generate processed results and add processed results to generate output RF signal, wherein two signal processing paths have mismatch condition modeled by mismatch parameter          S420

Perform feedback signal processing on output RF signal by feedback circuit to generate feedback signal, wherein feedback signal is generated by substituting complex number baseband signal to function that models input signal processing, frequency up-conversion and feedback signal processing, and function includes compensation parameter and mismatch parameter          S430

Control input circuit to set compensation parameter to be parameter values, and retrieve feedback values of feedback signal from feedback circuit, so as to solve mismatch parameter of function according to parameter values and feedback values by calibration calculation circuit          S440

Calibrate compensation parameter according to mismatch parameter by input circuit          S450

Fig. 4

SIGNAL TRANSMISSION APPARATUS AND METHOD HAVING MISMATCH CALIBRATION MECHANISM

BACKGROUND OF THE INVENTION

1. Field of the Invention

The present disclosure relates to a signal transmission apparatus and a signal transmission method having a mismatch calibration mechanism.

2. Description of Related Art

In wireless communication apparatuses, a baseband circuit provides a baseband signal that is a complex number to a signal transmission apparatus. The real part and the imaginary part of the baseband signal are processed by different signal paths in the signal transmission apparatus. The processed results are further modulated to generate an analog radio frequency (RF) signal to be transmitted by an antenna.

In an ideal condition, the different signal paths in the signal transmission apparatus include identical components and are matched with each other. However, due to the influence of manufacturing process, temperature, voltage or other factors, a mismatch condition of amplitudes or phases of the signals in the different signal paths occurs. The signal quality of the RF signal generated subsequently thus degrades.

SUMMARY OF THE INVENTION

In consideration of the problem of the prior art, an object of the present disclosure is to provide a signal transmission apparatus and a signal transmission method having a mismatch calibration mechanism.

The present invention discloses a signal transmission apparatus having a mismatch calibration mechanism that includes an input circuit, a frequency up-conversion circuit, a feedback circuit and a calibration calculation circuit. The input circuit is configured to performs an input signal processing on a first baseband signal and a second baseband signal that are orthogonal to each other and form a complex number baseband signal according to a compensation parameter to generate an input baseband signal. The frequency up-conversion circuit is configured to perform a frequency up-conversion on the input baseband signal through two signal processing paths having identical configurations to generate processed results and add the processed results to generate an output RF signal, wherein the two signal processing paths have a mismatch condition modeled by a mismatch parameter. The feedback circuit is configured to perform a feedback signal processing on the output RF signal to generate a feedback signal, wherein the feedback signal is generated by substituting the complex number baseband signal to a function that models the input signal processing, the frequency up-conversion and the feedback signal processing, and the function includes the compensation parameter and the mismatch parameter. The calibration calculation circuit is configured to control the input circuit to set the compensation parameter to be a plurality of parameter values, and retrieve a plurality of corresponding feedback values of the feedback signal from the feedback circuit, so as to solve the mismatch parameter of the function according to the parameter values and the feedback values such that the input circuit calibrates the compensation parameter according to the mismatch parameter.

The present invention also discloses a signal transmission method having a mismatch calibration mechanism used in a signal transmission apparatus that includes steps outlined below. An input signal processing is performed on a first baseband signal and a second baseband signal that are orthogonal to each other and form a complex number baseband signal according to a compensation parameter by an input circuit to generate an input baseband signal. A frequency up-conversion is performed on the input baseband signal through two signal processing paths having identical configurations by a frequency up-conversion circuit to generate processed results and add the processed results to generate an output RF signal, wherein the two signal processing paths have a mismatch condition modeled by a mismatch parameter. A feedback signal processing is performed on the output RF signal by a feedback circuit to generate a feedback signal, wherein the feedback signal is generated by substituting the complex number baseband signal to a function that models the input signal processing, the frequency up-conversion and the feedback signal processing, and the function includes the compensation parameter and the mismatch parameter. The input circuit is controlled to set the compensation parameter to be a plurality of parameter values, and a plurality of corresponding feedback values of the feedback signal are retrieved from the feedback circuit, so as to solve the mismatch parameter of the function according to the parameter values and the feedback values by a calibration calculation circuit. The compensation parameter is calibrated according to the mismatch parameter by the input circuit.

These and other objectives of the present disclosure will no doubt become obvious to those of ordinary skill in the art after reading the following detailed description of the preferred embodiments that are illustrated in the various figures and drawings.

BRIEF DESCRIPTION OF THE DRAWINGS

FIG. 4 illustrates a flow chart of a signal transmission method having a mismatch calibration mechanism according to an embodiment of the present invention.

DETAILED DESCRIPTION OF THE PREFERRED EMBODIMENTS

An aspect of the present invention is to provide a signal transmission apparatus and a signal transmission method having a mismatch calibration mechanism to control an input circuit to set a compensation parameter to be a plurality of parameter values and retrieve feedback values that a feedback signal corresponds to from a feedback circuit by a calibration calculation circuit to solve a mismatch parameter, between signal processing paths in the signal transmission apparatus, of a function that models the signal processing paths. The input circuit further calibrates a compensation parameter according to the mismatch parameter to accomplish a quick and accurate mismatch calibration result.

Figure 1:
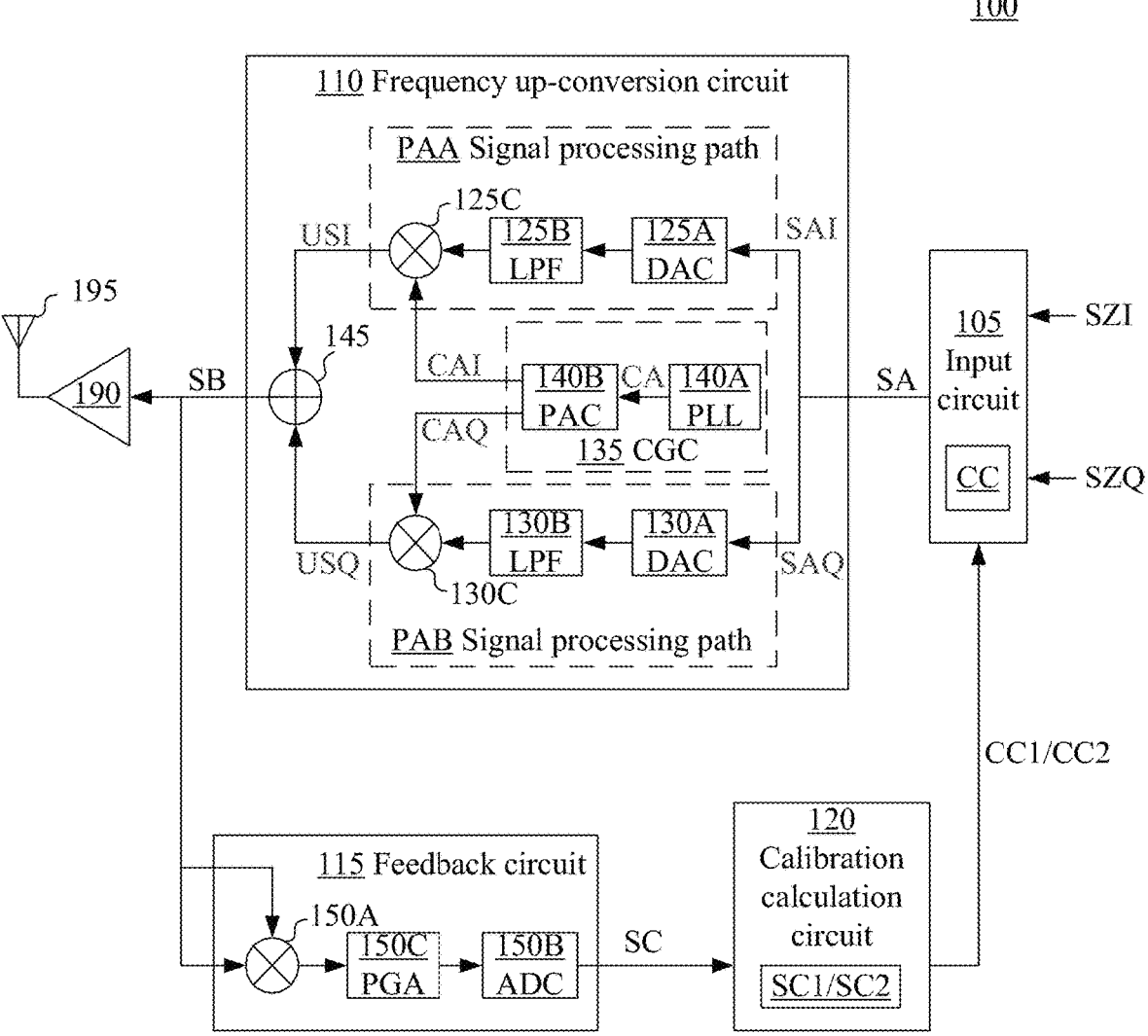
FIG. 1 illustrates a block diagram of a signal transmission apparatus having a mismatch calibration mechanism according to an embodiment of the present invention.
Figure 2:
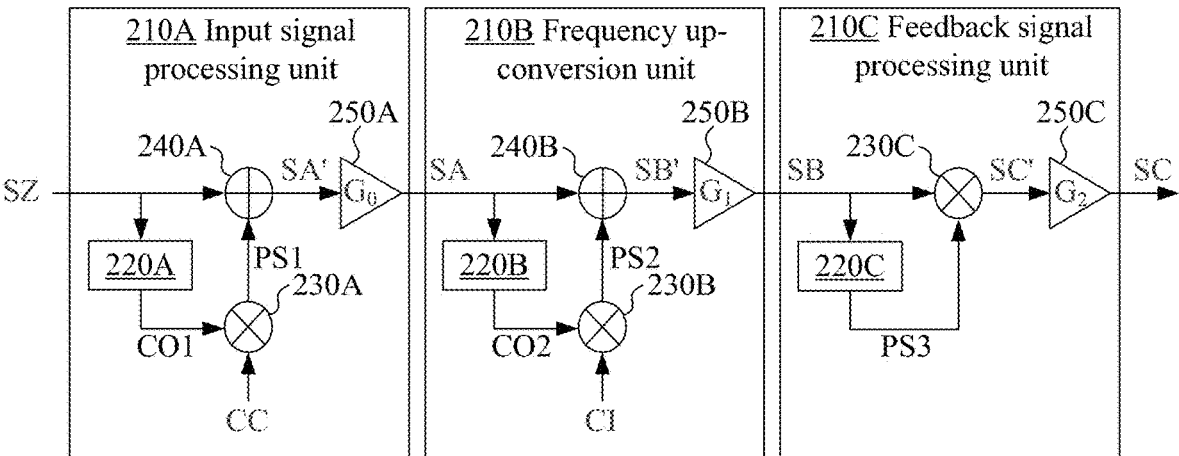
FIG. 2 illustrates a configuration diagram of an equivalent model of the signal transmission apparatus according to an embodiment of the present invention.

Reference is now made to FIG. 1 and FIG. 2 at the same time. FIG. 1 illustrates a block diagram of a signal transmission apparatus 100 having a mismatch calibration mechanism according to an embodiment of the present invention. FIG. 2 illustrates a configuration diagram of an equivalent model 200 of the signal transmission apparatus 100 according to an embodiment of the present invention.

The signals processed by the components in the signal transmission apparatus 100 in FIG. 1 are all real number signals. More specifically, the signal transmission apparatus 100 is configured to receive a first baseband signal SZI and a second baseband signal SZQ orthogonal to each other and perform signal processing thereon by using the components therein to generate an output RF signal SB.

The signals processed by the components in the equivalent model 200 of the signal transmission apparatus 100 in FIG. 2 are complex number signals. More specifically, since a 90 degrees phase difference is presented therebetween, the first baseband signal SZI and the second baseband signal SZQ form a complex number baseband signal SZ fed to the equivalent model 200 in FIG. 2. The equivalent model 200 in FIG. 2 is used to describe the equivalent processing performed on the signal in the form of the complex number by the components in the signal transmission apparatus 100.

The configuration and operation of the signal transmission apparatus 100 are described in accompany with both FIG. 1 and FIG. 2.

As illustrated in FIG. 1, the signal transmission apparatus 100 includes an input circuit 105, a frequency up-conversion circuit 110, a feedback circuit 115 and a calibration calculation circuit 120.

The input circuit 105 is configured to perform an input signal processing on the first baseband signal SZI and the second baseband signal SZQ that are orthogonal to each other and form the complex number baseband signal SZ according to a compensation parameter CC to generate an input baseband signal SA.

In an embodiment, each of the first baseband signal SZI and the second baseband signal SZQ is a single tone signal having a frequency of 0, and the first baseband signal SZI and the second baseband signal SZQ are orthogonal to each other. For example, the first baseband signal SZI and the second baseband signal SZQ can be respectively expressed as $\cos(\omega t)$ and $\sin(\omega t)$. The complex number baseband signal SZ that the first baseband signal SZI and the second baseband signal SZQ together form can be expressed as $\exp(j\omega t)$.

As illustrated in FIG. 2, the input signal processing performed by the input circuit 105 is modeled by an input signal processing unit 210A included by the equivalent model 200. The input signal processing unit 210A includes a conjugate calculation unit 220A, a multiplication unit 230A and a adder unit 240A.

More specifically, the input signal processing performed by the input circuit 105 includes performing a conjugate calculation on the complex number baseband signal SZ by the conjugate calculation unit 220A to generate a conjugate calculation result CO1 and multiplying the conjugate calculation result CO1 with the compensation parameter CC by the multiplication unit 230A to generate a processed signal PS1.

Subsequently, the input signal processing performed by the input circuit 105 includes adding the complex number baseband signal SZ and the processed signal PS1 by the adder unit 240A to generate the input baseband signal SA'.

In an embodiment, the input signal processing performed by the input circuit 105 may also include adjusting the intensity of the input baseband signal SA' according to a gain G0 to generate the input baseband signal SA. The adjusting can be performed by an amplifying unit 250A further included by the input signal processing unit 210A.

As a result, the input baseband signal SA generated according to the input signal processing and amplification performed by the input circuit 105 can be expressed as:

$$SA = G0 \times SA' = \qquad \text{(equation 1)}$$
$$G0 \times [SZ + CC \times CO1] = G0 \times [\exp(j\omega t) + CC \times \exp(-j\omega t)]$$

Reference is now made to FIG. 1 again. The frequency up-conversion circuit 110 in FIG. 1 is configured to perform a frequency up-conversion on the input baseband signal SA through two signal processing paths PAA and PAB having identical configurations to generate processed results and add the processed results to generate the output RF signal SB.

In an embodiment, the signal processing path PAA includes a digital-to-analog conversion circuit 125A (labeled as DAC in FIG. 1), a low-pass filter circuit 125B (labeled as LPF in FIG. 1) and a frequency mixer circuit 125C, to perform the frequency up-conversion that includes a digital-to-analog conversion processing, a low-pass filtering processing, a frequency up-conversion processing or a combination thereof in series on the real part SAI of the input baseband signal SA to generate a frequency up-converted signal USI. The frequency mixer circuit 125C may perform frequency up-conversion according to a carrier CAI to generate the frequency up-converted signal USI having a frequency of $\omega + L_O$.

Similarly, the signal processing paths PAB includes a digital-to-analog conversion circuit 130A (labeled as DAC in FIG. 1), low-pass filter circuit 130B (labeled as LPF in FIG. 1) and frequency mixer circuit 130C, to perform the frequency up-conversion that includes a digital-to-analog conversion processing, a low-pass filtering processing, a frequency up-conversion processing or a combination thereof in series on the imaginary part SAQ of the input baseband signal SA to generate a frequency up-converted signal USQ. The frequency mixer circuit 130C may perform frequency up-conversion according to a carrier CAQ of that the phase is orthogonal to the carrier CAI to generate the frequency up-converted signal USQ having a frequency of $\omega + L_O$.

In an embodiment, the carrier CAI and the carrier CAQ described above are generated by a carrier generation circuit 135 (labeled as CGC in FIG. 1) further included by the signal transmission apparatus 100.

More specifically, the carrier generation circuit 135 includes a phase lock loop circuit 140A (labeled as PLL in FIG. 1) and a phase modulation circuit 140B (labeled as PAC in FIG. 1). The phase lock loop circuit 140A is configured to generate a carrier CA. The phase modulation circuit 140B further performs phase modulation of 0 degree and 90 degrees on the carrier CA to generate the carrier CAI and the carrier CAQ orthogonal to each other.

It is appreciated that though the signal processing paths PAA and PAB include identical configuration since the circuits included therein are the same, a mismatch condition is presented between the signal processing paths PAA and PAB due to the influence of manufacturing process, temperature, voltage or other factors.

In the present embodiment, the frequency up-conversion circuit 110 further includes an adding circuit 145 configured to add the frequency up-converted signals USI and USQ generated by the signal processing paths PAA and PAB to generate the output RF signal SB.

As illustrated in FIG. 2, the frequency up-conversion performed by the frequency up-conversion circuit 110 is modeled by a frequency up-conversion unit 210B included by the equivalent model 200. The frequency up-conversion unit 210B includes a conjugate calculation unit 220B, a multiplication unit 230B and an adder unit 240B.

More specifically, the frequency up-conversion performed by the frequency up-conversion circuit 110 includes performing a conjugate calculation on the input baseband signal SA by the conjugate calculation unit 220B to generate the conjugate calculation result CO2 and multiplying the conjugate calculation result CO2 and a mismatch parameter CI by the multiplication unit 230B to generate a processed signal PS2.

The mismatch parameter CI is used to model the mismatch condition presented between the signal processing paths PAA and PAB in FIG. 1. Under an ideal condition that the signal processing paths PAA and PAB are perfectly matched, the mismatch parameter CI is 0. However, in practical condition, the mismatch parameter CI has a non-zero value.

Subsequently, the frequency up-conversion performed by the frequency up-conversion circuit 110 includes adding the input baseband signal SA and the processed signal PS2 by the adder unit 240B to generate the output RF signal SB'.

In an embodiment, the frequency up-conversion performed by the frequency up-conversion circuit 110 may also include adjusting the intensity of the output RF signal SB' according to a gain G1 to generate the output RF signal SB. The adjusting can be performed by an amplifying unit 250B further included by the frequency up-conversion unit 210B.

As a result, the output RF signal SB generated according to the frequency up-conversion and amplification performed by the frequency up-conversion circuit 110 can be expressed as:

$$SB = G1 \times SB' = G1 \times [SA + CI \times CO2] \qquad \text{(equation 2)}$$

In an embodiment, if both the gain G0 and the gain G1 are 1, the output RF signal SB is expressed as:

$$SB = (\exp(j\omega t) + CC \times \exp(-j\omega t)) + \qquad \text{(equation 3)}$$
$$CI \times (\exp(j\omega t) + CC \times \exp(-j\omega t))^* =$$
$$(1 + CI \times CC^*) \times \exp(j\omega t) + (CI + CC) \times \exp(-j\omega t)$$

Reference is now made to FIG. 1 again. The feedback circuit 115 in FIG. 1 is configured to perform a feedback signal processing on the output RF signal SB to generate a feedback signal SC. In an embodiment, the signal transmission apparatus 100 may additionally dispose an amplifying circuit (not illustrated in the figure) between the frequency up-conversion circuit 110 and the feedback circuit 115 such that the output RF signal SB is amplified first for the feedback circuit 115 to perform the feedback signal processing subsequently.

In an embodiment, the feedback circuit 115 includes a multiplication operation circuit 150A, an analog-to-digital conversion circuit 150B (labeled as ADC in FIG. 1) or a combination thereof such that the feedback circuit 115 performs the feedback signal processing that includes performing a self-multiplication operation processing, an analog-to-digital conversion processing or a combination thereof on the output RF signal SB.

In an embodiment, the feedback circuit 115 may selectively include an amplifying circuit 150C (labeled as PGA in FIG. 1) to perform amplification on a processed result generated by the multiplication operation circuit 150A for the analog-to-digital conversion circuit 150B to perform the analog-to-digital conversion processing subsequently.

As illustrated in FIG. 2, the feedback signal processing performed by the feedback circuit 115 is modeled by a feedback signal processing unit 210C included by the equivalent model 200. The feedback signal processing 210C includes a conjugate calculation unit 220C and a multiplication unit 230C.

More specifically, the feedback signal processing performed by the feedback circuit 115 includes performing a conjugate calculation on the output RF signal SB by the conjugate calculation unit 220C to generate a processed signal PS3. Subsequently, the feedback signal processing performed by the feedback circuit 115 includes multiplying the output RF signal SB and processed signal PS3 by the multiplication unit 230C to generate the feedback signal SC'.

In an embodiment, the feedback signal processing performed by the feedback circuit 115 may also include adjusting the intensity of the feedback signal SC' according to a gain G2 to generate the feedback signal SC. The adjusting can be performed by an amplifying unit 250C further included by the feedback signal processing unit 210C.

As a result, the feedback signal SC generated according to the feedback signal processing and amplification performed by the feedback circuit 115 can be expressed as:

$$SC = G2 \times SC' = G2 \times [SB \times PS3] \qquad \text{(equation 4)}$$

In an embodiment, if all the gain G0, the gain G1 and the gain G2 are 1, the feedback signal SC is expressed as:

$$SC = SB \times PS3 = (SA + CI \times CO2) \times (SA + CI \times CO2)^* = \qquad \text{(equation 5)}$$
$$((SZ + CC \times CO1) + CI \times (SZ + CC \times CO1)^*) \times$$
$$((SZ + CC \times CO1) + CI \times (SZ + CC \times CO1)^*)^* = f(CC, CI)$$

According to (equation 5), the value of the feedback signal SC is generated by substituting the complex number baseband signal SZ to a function f(CC, CI) that models the input signal processing, the frequency up-conversion and the feedback signal processing. Such a function f(CC, CI) includes variables that include the compensation parameter CC and the mismatch parameter CI.

Reference is now made to FIG. 1 again. The calibration calculation circuit 120 in FIG. 1 is configured to control the input circuit 105 to set the compensation parameter CC to be a plurality of parameter values and retrieve a plurality of feedback values of the feedback signal SC, so as to solve the mismatch parameter CI of the function according to the parameter values and the feedback values such that the input circuit 105 calibrates the compensation parameter CC according to the mismatch parameter CI.

Since the calibration calculation circuit 120 does not affect the performing of the input signal processing, the frequency up-conversion and the feedback signal processing, the calibration calculation circuit 120 is not presented in the equivalent model 200 in FIG. 2.

In an embodiment, the calibration calculation circuit 120 controls the input circuit 105 to set the compensation parameter CC to be two parameter values in series to retrieve two feedback values of the feedback signal SC in series to solve the mismatch parameter CI of the function.

More specifically, at first, the calibration calculation circuit 120 controls the input circuit 105 to set the compensation parameter CC to be a first parameter value CC1 and retrieves a first feedback value SC1 of the feedback signal SC. Such a process is expressed as:

$$SC1 = f(CC1, CI) \qquad \text{(equation 6)}$$

Subsequently, the calibration calculation circuit 120 controls the input circuit 105 to set the compensation parameter CC to be a second parameter value CC2 and retrieves a second feedback value SC2 of the feedback signal SC. Such a process is expressed as:

$$SC2 = f(CC2, CI) \qquad \text{(equation 7)}$$

The calibration calculation circuit 120 solves (equation 6) and (equation 7) to obtain the value of the mismatch parameter CI.

Figure 3A:
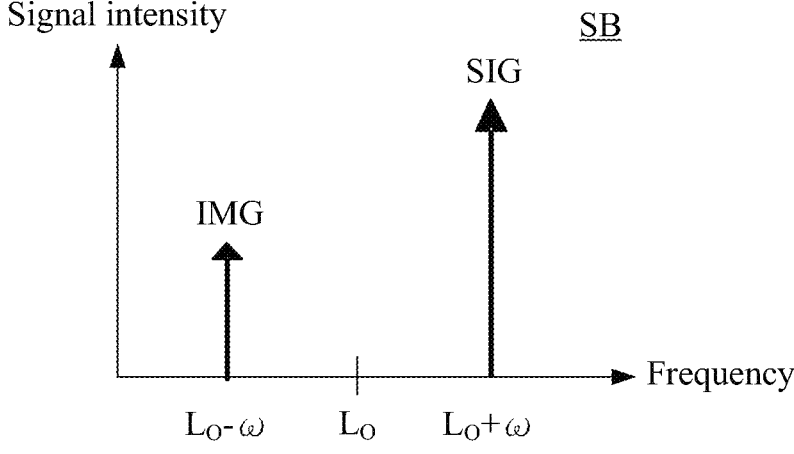
FIG. 3A illustrates a diagram of the output RF signal on the frequency domain according to an embodiment of the present invention.
Figure 3B:
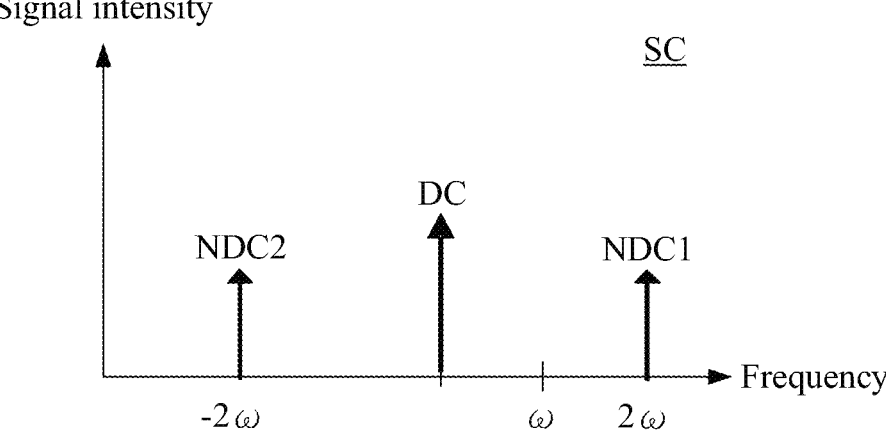
FIG. 3B illustrates a diagram of the feedback signal on the frequency domain according to an embodiment of the present invention.

Reference is now made to FIG. 3A and FIG. 3B. FIG. 3A illustrates a diagram of the output RF signal SB on the frequency domain according to an embodiment of the present invention. FIG. 3B illustrates a diagram of the feedback signal SC on the frequency domain according to an embodiment of the present invention. In FIG. 3A and FIG. 3B, the X-axis is frequency and the Y-axis is signal intensity.

Since each of the first baseband signal SZI and the second baseband signal SZQ is a single tone signal having a frequency of w, according to (equation 3), the output RF signal SB includes a real part signal SIG and a non-zero imaginary part signal IMG in FIG. 3A when the mismatch parameter CI has a non-zero value and the compensation parameter CC is set to be 0. The real part signal SIG corresponds to the term "$(1+CI \times CC^*) \times \exp(j\omega t)$" in (equation 3) and has the frequency $L_O+\omega$. The imaginary part signal IMG corresponds to the term "$(CI+CC) \times \exp(-j\omega t)$" in (equation 3) and has the frequency $L_O-\omega$.

Further, based on the real part signal SIG and the non-zero imaginary part signal IMG, the feedback signal SC not only includes a direct current component DC having a frequency of 0 in FIG. 3B, but also includes non-direct-current components NDC1 and NDC2. The non-direct-current component NDC1 corresponds to a frequency $2\omega$. The non-direct-current component NDC2 corresponds to a frequency $-2\omega$. As a result, in different embodiments, the calibration calculation circuit 120 retrieves the feedback values of the feedback signal SC according to the power or a Fourier transformation result of one of the non-direct-current component NDC1 and the non-direct-current component NDC2 of the feedback signal SC. Each of these feedback values corresponds to a non-direct-current component of the feedback signal SCs.

In an embodiment, when the compensation parameter CC is an additive inverse of the mismatch parameter CI, i.e., CC=−CI, the imaginary part signal in (equation 3) becomes 0. As a result, the input circuit 105 can set the compensation parameter CC to be the additive inverse of the mismatch parameter CI to perform calibration to accomplish an optimal calibration result.

In an embodiment, the calibration calculation circuit 120 performs the calibration mechanism described above when the signal transmission apparatus 100 initializes to operate, when a filtering bandwidth of low-pass filter circuits 125B and 130B varies or when a carrier frequency of the frequency mixer circuits 125C and 130C varies. The mismatch calibration can thus be performed on the signal processing paths PAA and PAB.

A power amplification can be performed on the output RF signal SB by such as, but not limited to an amplifying circuit 190 and then the amplified output RF signal SB is transmitted through an antenna 195. The amplifying circuit 190 and the antenna 195 can be selectively disposed outside of the signal transmission apparatus 100 or disposed as a part of the signal transmission apparatus 100.

In some approaches, the signal transmission apparatus is not equipped with the mismatch calibration mechanism. As a result, the output RF signal includes the imaginary part of the signal due to the mismatch of the signal paths such that the quality of the signal degrades.

The signal transmission apparatus having a mismatch calibration mechanism of the present invention controls an input circuit to set a compensation parameter to be a plurality of parameter values and retrieve feedback values that a feedback signal corresponds to from a feedback circuit by a calibration calculation circuit to solve a mismatch parameter, between signal processing paths in the signal transmission apparatus, of a function that models the signal processing paths. The input circuit further calibrates a compensation parameter according to the mismatch parameter to accomplish a quick and accurate mismatch calibration result.

Reference is now made to FIG. 4. FIG. 4 illustrates a flow chart of a signal transmission method 400 having a mismatch calibration mechanism according to an embodiment of the present invention.

Besides the apparatus described above, the present invention further discloses the signal transmission method 400 that can be used in such as, but not limited to the signal transmission apparatus 100 illustrated in FIG. 1. An embodiment of the signal transmission method 400 is illustrated in FIG. 4 and includes the steps outlined below.

In step S410, the input signal processing is performed on the first baseband signal SZI and the second baseband signal SZQ that are orthogonal to each other and form the complex number baseband signal SZ according to the compensation parameter CC by the input circuit 150 to generate the input baseband signal SA.

In step S420, the frequency up-conversion is performed on the input baseband signal SA through the two signal processing paths PAA and PAB having identical configurations by the frequency up-conversion circuit 110 to generate the processed results and add the processed results to generate the output RF signal SB, wherein the two signal processing paths PAA and PAB have the mismatch condition modeled by the mismatch parameter CI.

In step S430, the feedback signal processing is performed on the output RF signal SB by the feedback circuit 115 to generate the feedback signal SC, wherein the feedback signal SC is generated by substituting the complex number baseband signal SZ to the function that models the input signal processing, the frequency up-conversion and the feedback signal processing, and the function includes the compensation parameter CC and the mismatch parameter CI.

In step S440, the input circuit 105 is controlled to set the compensation parameter CC to be the parameter values, and the corresponding feedback values of the feedback signal SC are retrieved from the feedback circuit 115, so as to solve the mismatch parameter CI of the function according to the parameter values and the feedback values by the calibration calculation circuit 120.

In step S450, the compensation parameter CC is calibrated according to the mismatch parameter CI by the input circuit 105.

It is appreciated that the embodiments described above are merely an example. In other embodiments, it is appreciated that many modifications and changes may be made by those of ordinary skill in the art without departing, from the spirit of the invention. For example, each of the circuits in FIG. 1 used to transmit and process the complex number baseband signal SZ may include different components and configurations such that the content of the function does not necessarily match the content described above. Further, the calibration calculation circuit 120 may use other methods to solve the mismatch parameter, or use different methods to calibrate the compensation parameter according to the mismatch parameter. The present invention is not limited thereto.

In summary, the signal transmission apparatus and the signal transmission method having a mismatch calibration mechanism control an input circuit to set a compensation parameter to be a plurality of parameter values and retrieve feedback values that a feedback signal corresponds to from a feedback circuit by a calibration calculation circuit to solve a mismatch parameter, between signal processing paths in the signal transmission apparatus, of a function that models the signal processing paths. The input circuit further calibrates a compensation parameter according to the mismatch parameter to accomplish a quick and accurate mismatch calibration result.

The aforementioned descriptions represent merely the preferred embodiments of the present disclosure, without any intention to limit the scope of the present disclosure thereto. Various equivalent changes, alterations, or modifications based on the claims of present disclosure are all consequently viewed as being embraced by the scope of the present disclosure.

What is claimed is:

1. A signal transmission apparatus having a mismatch calibration mechanism, comprising:

an input circuit configured to perform an input signal processing on a first baseband signal and a second baseband signal that are orthogonal to each other and form a complex number baseband signal according to a compensation parameter to generate an input baseband signal;

a frequency up-conversion circuit configured to perform a frequency up-conversion on the input baseband signal through two signal processing paths having identical configurations to generate processed results and add the processed results to generate an output RF signal, wherein the two signal processing paths have a mismatch condition modeled by a mismatch parameter;

a feedback circuit configured to perform a feedback signal processing on the output RF signal to generate a feedback signal, wherein the feedback signal is generated by substituting the complex number baseband signal to a function that models the input signal processing, the frequency up-conversion and the feedback signal processing, and the function includes the compensation parameter and the mismatch parameter; and a calibration calculation circuit configured to control the input circuit to set the compensation parameter to be a plurality of parameter values, and retrieve a plurality of corresponding feedback values of the feedback signal from the feedback circuit, so as to solve the mismatch parameter of the function according to the parameter values and the feedback values such that the input circuit calibrates the compensation parameter according to the mismatch parameter.

2. The signal transmission apparatus of claim 1, wherein the input circuit sets the compensation parameter to be an additive inverse of the mismatch parameter to perform the calibration.

3. The signal transmission apparatus of claim 1, wherein each of the two signal processing paths comprises a digital-to-analog conversion circuit, a low-pass filter circuit, a frequency mixer circuit or a combination thereof to allow each of the two signal processing paths to perform the frequency up-conversion that comprises a digital-to-analog conversion processing, a low-pass filtering processing, a frequency up-conversion processing or a combination thereof to generate a frequency up-converted signal;

wherein the frequency up-conversion circuit further comprises an adding circuit configured to add the frequency up-converted signal generated by each of the two signal processing paths to generate the output RF signal.

4. The signal transmission apparatus of claim 3, wherein the calibration calculation circuit performs the calibration when the signal transmission apparatus initializes to operate, when a filtering bandwidth of the low-pass filter circuit varies or when a carrier frequency of the frequency mixer circuit varies.

5. The signal transmission apparatus of claim 1, wherein the feedback circuit comprises a multiplication operation circuit, an analog-to-digital conversion circuit or a combination thereof such that the feedback circuit performs the feedback signal processing that comprises a self-multiplication operation processing, an analog-to-digital conversion processing or a combination thereof performed on the output RF signal.

6. The signal transmission apparatus of claim 1, wherein the input signal processing performed by the input circuit is equivalently configured to:

perform a conjugate calculation on the complex number baseband signal to generate a conjugate calculation result and multiply the conjugate calculation result with the compensation parameter to generate a processed signal; and add the complex number baseband signal and the processed signal to generate the input baseband signal.

7. The signal transmission apparatus of claim 1, wherein the frequency up-conversion performed by the frequency up-conversion circuit is equivalently configured to:

perform a conjugate calculation on the input baseband signal to generate a conjugate calculation result and multiply the conjugate calculation result with the mismatch parameter to generate a processed signal; and add the input baseband signal and the processed signal to generate the output RF signal.

8. The signal transmission apparatus of claim 1, wherein the feedback signal processing performed by the feedback circuit is equivalently configured to:

perform a conjugate calculation on the output RF signal to generate a processed signal; and multiply the output RF signal and the processed signal to generate the feedback signal.

9. The signal transmission apparatus of claim 1, wherein the calibration calculation circuit obtains the feedback values according to a power or a Fourier transformation result of the feedback signal.

10. The signal transmission apparatus of claim 9, wherein each of the first baseband signal and the second baseband signal is a single tone signal, and each of the feedback values corresponds to a non-direct-current component of the feedback signal.

11. A signal transmission method having a mismatch calibration mechanism used in a signal transmission apparatus, comprising:

performing an input signal processing on a first baseband signal and a second baseband signal that are orthogonal to each other and form a complex number baseband signal according to a compensation parameter by an input circuit to generate an input baseband signal;

performing a frequency up-conversion on the input baseband signal through two signal processing paths having identical configurations by a frequency up-conversion circuit to generate processed results and add the processed results to generate an output RF signal, wherein the two signal processing paths have a mismatch condition modeled by a mismatch parameter;

performing a feedback signal processing on the output RF signal by a feedback circuit to generate a feedback signal, wherein the feedback signal is generated by substituting the complex number baseband signal to a function that models the input signal processing, the frequency up-conversion and the feedback signal processing, and the function includes the compensation parameter and the mismatch parameter;

controlling the input circuit to set the compensation parameter to be a plurality of parameter values, and retrieving a plurality of corresponding feedback values of the feedback signal from the feedback circuit, so as to solve the mismatch parameter of the function according to the parameter values and the feedback values by a calibration calculation circuit; and calibrating the compensation parameter according to the mismatch parameter by the input circuit.

12. The signal transmission method of claim 11, further comprising:

setting the compensation parameter to be an additive inverse of the mismatch parameter by the input circuit to perform the calibration.

13. The signal transmission method of claim 11, wherein each of the two signal processing paths comprises a digital-to-analog conversion circuit, a low-pass filter circuit, a frequency mixer circuit or a combination thereof, the signal transmission method further comprises:

performing the frequency up-conversion that comprises a digital-to-analog conversion processing, a low-pass filtering processing, a frequency up-conversion processing or a combination thereof by each of the two signal processing paths to generate a frequency up-converted signal; and adding the frequency up-converted signal generated by each of the two signal processing paths to generate the output RF signal by an adding circuit further comprised by the frequency up-conversion circuit.

14. The signal transmission method of claim 13, further comprising:

performing the calibration by the calibration calculation circuit when the signal transmission apparatus initializes to operate, when a filtering bandwidth of the low-pass filter circuit varies or when a carrier frequency of the frequency mixer circuit varies.

15. The signal transmission method of claim 11, wherein the feedback circuit comprises a multiplication operation circuit, an analog-to-digital conversion circuit or a combination thereof, the signal transmission method further comprises:

performing the feedback signal processing that comprises a self-multiplication operation processing, an analog-to-digital conversion processing or a combination thereof by the feedback circuit performed on the output RF signal.

16. The signal transmission method of claim 11, wherein the input signal processing performed by the input circuit is equivalently configured to:

perform a conjugate calculation on the complex number baseband signal to generate a conjugate calculation result and multiply the conjugate calculation result with the compensation parameter to generate a processed signal; and add the complex number baseband signal and the processed signal to generate the input baseband signal.

17. The signal transmission method of claim 11, wherein the frequency up-conversion performed by the frequency up-conversion circuit is equivalently configured to:

perform a conjugate calculation on the input baseband signal to generate a conjugate calculation result and multiply the conjugate calculation result with the mismatch parameter to generate a processed signal; and add the input baseband signal and the processed signal to generate the output RF signal.

18. The signal transmission method of claim 11, wherein the feedback signal processing performed by the feedback circuit is equivalently configured to:

perform a conjugate calculation on the output RF signal to generate a processed signal; and multiply the output RF signal and the processed signal to generate the feedback signal.

19. The signal transmission method of claim 11, further comprising:

obtaining the feedback values according to a power or a Fourier transformation result of the feedback signal by the calibration calculation circuit.

20. The signal transmission method of claim 19, wherein each of the first baseband signal and the second baseband signal is a single tone signal, and each of the feedback values corresponds to a non-direct-current component of the feedback signal.

* * * * *